Sept. 28, 1926.  J. OSTRIA  1,601,641
BUMPER
Filed March 17, 1926  3 Sheets-Sheet 1
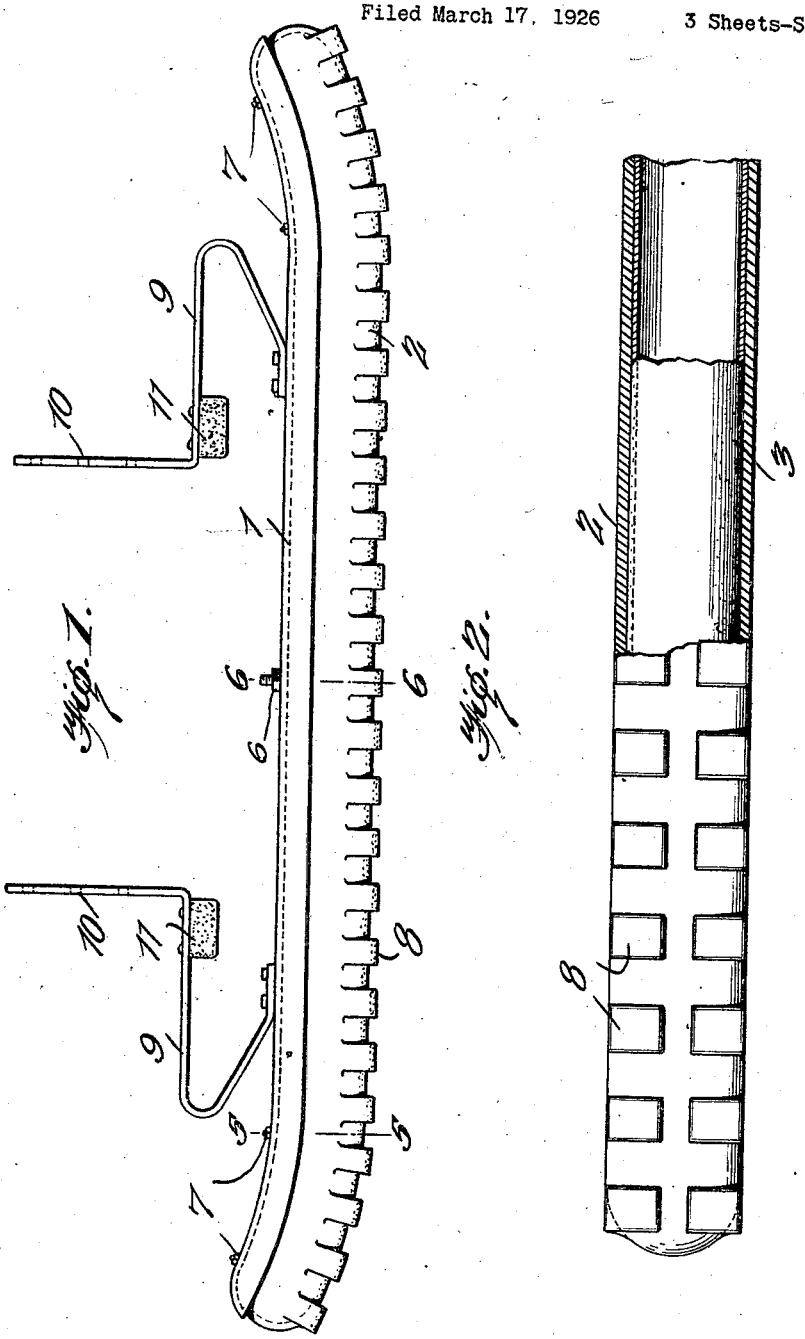
JOSE OSTRIA, INVENTOR
BY Victor J. Evans
ATTORNEY

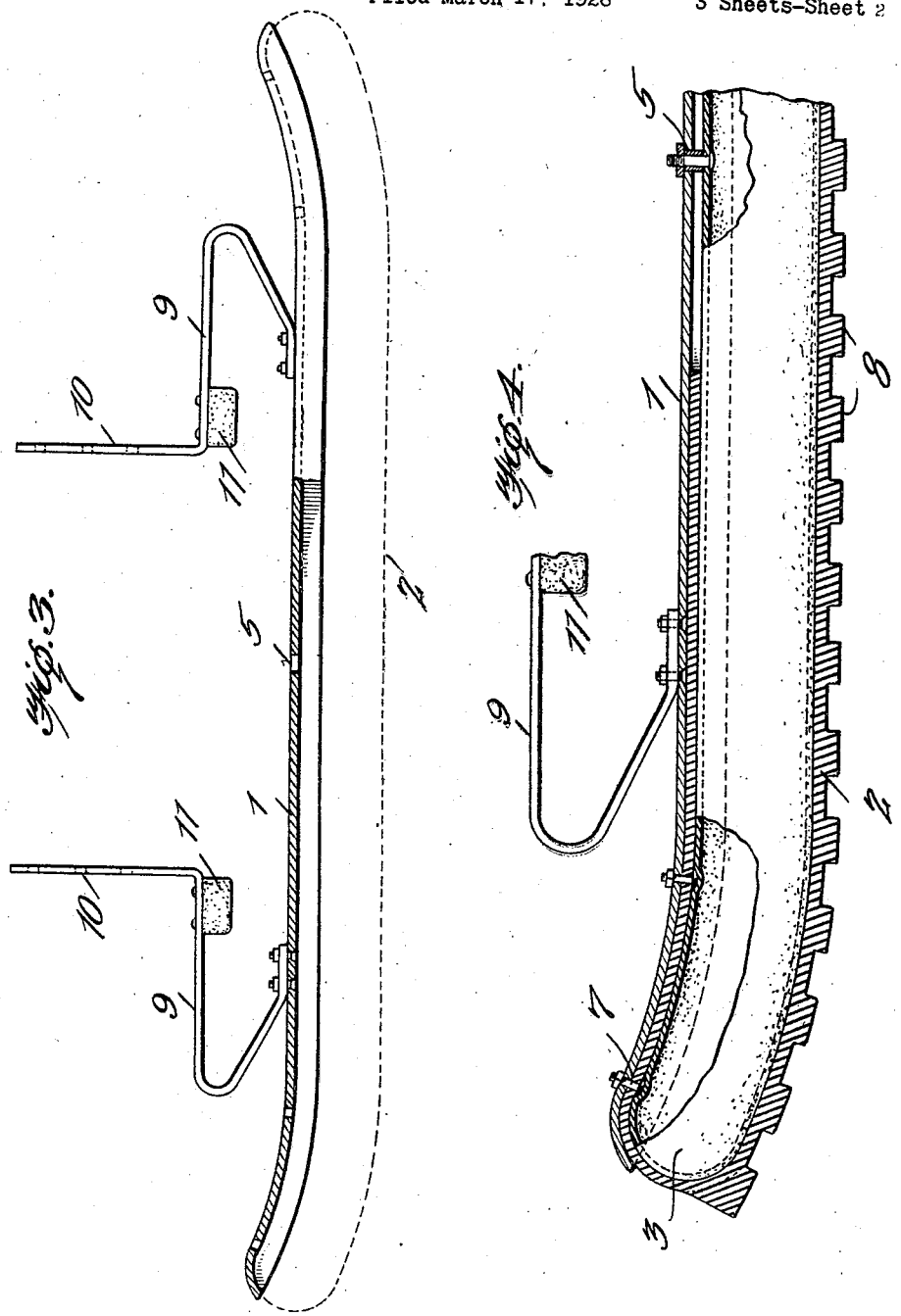

Sept. 28, 1926.   J. OSTRIA   1,601,641
BUMPER
Filed March 17, 1926   3 Sheets-Sheet 3
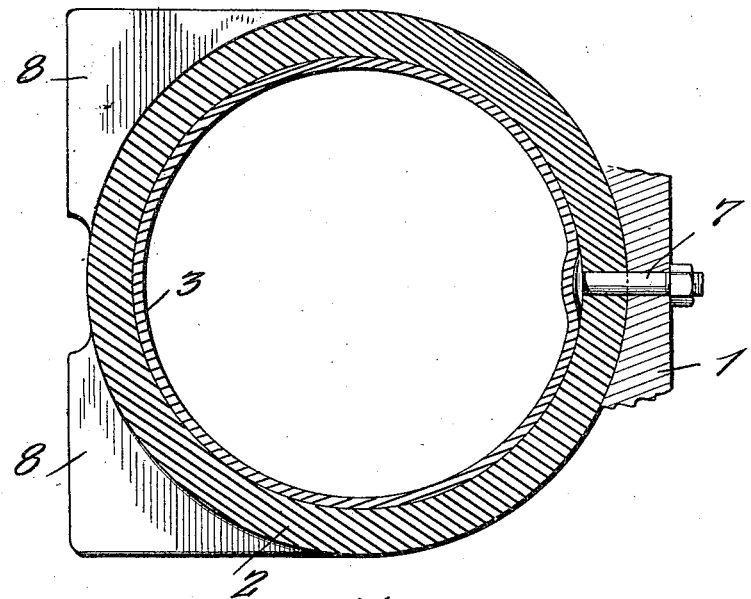
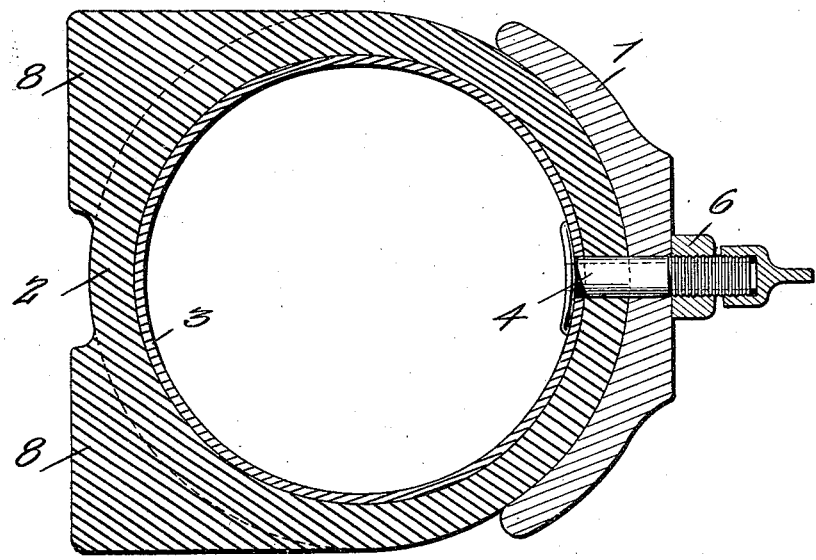
JOSE OSTRIA, INVENTOR
BY Victor J. Evans
ATTORNEY Patented Sept. 28, 1926.

1,601,641

UNITED STATES PATENT OFFICE.

JOSÉ OSTRIA, OF SAN FRANCISCO, CALIFORNIA.

BUMPER.

Application filed March 17, 1926. Serial No. 95,366.

This invention relates to an improved bumper for motor vehicles and the like, the general object of the invention being to provide a pneumatic member forming part of the bumper for absorbing shocks due to the bumper striking obstacles, which in addition to the spring means of the bumper, will act to effectively protect the vehicle against damage when striking obstructions of various kinds.

Another object of the invention is to provide the front of the pneumatic member with the upper and lower rows of spaced projections which have square outer faces, these projections reinforcing the member and giving it a more attractive appearance.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the improved bumper.

Figure 2 is a front view of the pneumatic member, with parts in section.

Figure 3 is a view similar to Figure 1, but showing parts broken away and parts in section.

Figure 4 is an enlarged horizontal sectional view through one end of the member.

Figure 5 is a section on line 5—5 of Figure 1.

Figure 6 is a section on line 6—6 of Figure 1.

In these drawings, 1 indicates a substantially trough-shaped member which acts as a holder for the pneumatic member which consists of the casing 2 and the tube 3 which is provided with the usual stem 4 by which the pneumatic member can be inflated by an air pump or the like. This stem passes through a hole 5 forming the central part of the member 1, a nut 6 being provided for holding the stem against movement, said nut bearing against the rear face of the member 1. The major portion of the front part of the bumper which is composed of the pneumatic member and the member 1 is straight, but the ends curve rearwardly so as to give this part of the bumper the usual shape.

The casing 2 is held in the trough-shaped member 1 by the bolts 7 and the stem 4 and its nut 6 also act to hold the pneumatic member in the member 1. The front of the casing is formed with upper and lower rows of projections 8 which have straight or flat outer faces. These projections are spaced apart and form rectangular shaped blocks which project from the front face of the casing, as shown in Figure 2. These blocks or projections not only act to reinforce the casing, but also add to its appearance.

Of a pair of spring brackets 9 each has one end fastened to the rear part of the member 1 and the other ends of these brackets extend rearwardly and are provided with a plurality of holes 10 for receiving bolts for fastening the brackets to the front part of the vehicle. Blocks 11, of resilient material, are fastened to those portions of the brackets which parallel the member 1, so that said blocks will engage the member 1 when the bumper is struck a blow severe enough to drive the front portion thereof rearwardly against the blocks.

From the foregoing, it will be seen that I have produced a bumper which, owing to the pneumatic part thereof, will have great shock absorbing properties and one which will add to the appearance of the vehicle on which it is placed. Slight shocks will be taken and absorbed by the pneumatic member, but the severe shocks will be absorbed both by the pneumatic member and the blocks 11 as well as the spring parts of the brackets 9. The blocks 8 on the front of the pneumatic member, dividing the same into a longitudinally extending groove and transversely extending grooves, reinforce the member but add to its appearance.

The casing 2 has an opening therein through which the tube 3 can be inserted.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A bumper of the class described comprising a trough-shaped holding member, a pneumatic member therein with the major portion of the member projecting from the holding member, said pneumatic member comprising a casing and a tube with means for inflating the tube, upper and lower rows of spaced blocks or projections on the front of the pneumatic member, said blocks having flat front and outer faces and brackets for connecting the holding member to a vehicle.

In testimony whereof I affix my signature.

JOSÉ OSTRIA.